United States Patent
Ishishita

(10) Patent No.: US 8,078,417 B2
(45) Date of Patent: Dec. 13, 2011

(54) APPARATUS AND METHOD FOR CONTROLLING CHARGING AND DISCHARGING POWER STORAGE DEVICE

(75) Inventor: Teruo Ishishita, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 680 days.

(21) Appl. No.: 12/226,530

(22) PCT Filed: May 21, 2007

(86) PCT No.: PCT/JP2007/060751
§ 371 (c)(1),
(2), (4) Date: Oct. 21, 2008

(87) PCT Pub. No.: WO2007/136126
PCT Pub. Date: Nov. 29, 2007

(65) Prior Publication Data
US 2009/0099800 A1    Apr. 16, 2009

(30) Foreign Application Priority Data

May 22, 2006    (JP) .................................. 2006-141792

(51) Int. Cl.
*G01R 31/36*    (2006.01)
(52) U.S. Cl. ........................................................ 702/63
(58) Field of Classification Search ................ 702/63
See application file for complete search history.

(56) References Cited

U.S. PATENT DOCUMENTS
2008/0014852 A1*    1/2008 Mielke et al. ................... 454/75

FOREIGN PATENT DOCUMENTS

| | | |
|---|---|---|
| EP | 1 134 855 A2 | 9/2001 |
| JP | A-63-209436 | 8/1988 |
| JP | A-01-114337 | 5/1989 |
| JP | A-07-250404 | 9/1995 |
| JP | A-11-332016 | 11/1999 |
| JP | A-11-355967 | 12/1999 |
| JP | A-2001-239902 | 9/2001 |
| JP | A-2002-051405 | 2/2002 |
| JP | A-2003-244862 | 8/2003 |
| JP | A-2004-245190 | 9/2004 |
| JP | A-2005-335443 | 12/2005 |
| RU | 2 131 158 C1 | 5/1999 |

OTHER PUBLICATIONS

Decision on Grant for corresponding Russian Patent Application No. 2008150486/07(0066309), mailed on Jun. 8, 2010 (w/ English translation).

* cited by examiner

*Primary Examiner* — Aditya Bhat
(74) *Attorney, Agent, or Firm* — Oliff & Berridge, PLC

(57) ABSTRACT

At time t1 an ignition-off command (IGOFF(1)) is received. In response, a CPU refers to an estimated battery temperature map to obtain an estimated battery temperature (#Tb(1)) corresponding to an outside air temperature (Tout) obtained at time t1. At time t2, an ignition-on command (IGON(1)) is received. In response, the CPU obtains an actual battery temperature (Tb(1)) obtained at time t2 and from the estimated battery temperature (#Tb(1)) and the actual battery temperature (Tb(1)) calculates a modified, estimated battery temperature (#Tb_NEW(1)) for the first received ignition-on command (IGON(1)). Furthermore the CPU updates a value corresponding to the outside air temperature (Tout) obtained at time t1 in the estimated battery temperature map to be the corrected, estimated battery temperature (#Tb_NEW(1)).

9 Claims, 14 Drawing Sheets

| OUTSIDE AIR TEMPERATURE Tout [°C] | -30 | -25 | ... | 0 | ... | 25 | 30 |
|---|---|---|---|---|---|---|---|
| ESTIMATED BATTERY TEMPERATURE #Tb [°C] | -35 | -30 | ... | -15 | ... | 20 | 25 |

| OUTSIDE AIR TEMPERATURE Tout [°C] / IGOFF TIME ZONE | -30 | -25 | ... | 0 | ... | 25 | 30 |
|---|---|---|---|---|---|---|---|
| MORNING (7:00~12:00) | -25 | -20 | ... | -5 | ... | 25 | 30 |
| AFTERNOON (12:00~17:00) | -30 | -25 | ... | -10 | ... | 20 | 25 |
| EVENING (17:00~20:00) | -35 | -30 | ... | -15 | ... | 15 | 20 |
| LATE NIGHT & EARLY MORNING (20:00~17:00) | -35 | -30 | ... | -20 | ... | 15 | 20 |

| ESTIMATED BATTERY TEMPERATURE #Tb[°C] | | OUTSIDE AIR TEMPERATURE Tout[°C] | | | | | | |
|---|---|---|---|---|---|---|---|---|
| | | -30 | -25 | ... | 0 | ... | 25 | 30 |
| Tb WHEN IGOFF IS IMMEDIATELY PREVIOUSLY RECEIVED[°C] | -30 | -30 | -25 | ... | -20 | ... | -20 | -25 |
| | -25 | -25 | -20 | ... | -15 | ... | -20 | -20 |
| | ⋮ | ⋮ | ⋮ | ⋮ | ⋮ | ⋮ | ⋮ | ⋮ |
| | 0 | 0 | -5 | 0 | ... | 0 | ... | 0 | -5 |
| | ⋮ | ⋮ | ⋮ | ⋮ | ⋮ | ⋮ | ⋮ | ⋮ |
| | 25 | 20 | 20 | ... | 10 | ... | 25 | 25 |
| | 30 | 25 | 25 | ... | 15 | ... | 25 | 30 |

| ESTIMATED BATTERY TEMPERATURE #Tb[°C] | | OUTSIDE AIR TEMPERATURE Tout[°C] | | | | | | |
|---|---|---|---|---|---|---|---|---|
| | | -30 | -25 | ... | 0 | ... | 25 | 30 |
| PERIOD OF DURATION FOR WHICH VEHICULAR SYSTEM IS ACTIVE [h] | ~1 | -35 | -30 | ... | -15 | ... | 20 | 25 |
| | ~2 | -35 | -30 | ... | -15 | ... | 20 | 25 |
| | ⋮ | ⋮ | ⋮ | ⋱ | ⋮ | ⋱ | ⋮ | ⋮ |
| | ~10 | -35 | -25 | ... | -20 | ... | 15 | 20 |
| | ⋮ | ⋮ | ⋮ | ⋱ | ⋮ | ⋱ | ⋮ | ⋮ |

APPARATUS AND METHOD FOR CONTROLLING CHARGING AND DISCHARGING POWER STORAGE DEVICE

TECHNICAL FIELD

The present invention relates generally to apparatuses and methods for controlling charging and discharging rechargeable power storage devices and particularly to technology employed to ensure that a vehicular system that has been shut down restarts.

BACKGROUND ART

Hybrid vehicles, electric vehicles and other similar motored vehicles capable of generating electric power while they are traveling have a secondary battery, an electric double layer capacitor or a similar power storage device mounted therein. For example, the hybrid vehicle has a motor generator converting the electric power that is stored in the power storage device into a driving power which is in turn transmitted to a wheel singly or together with a driving power that the engine generates.

A secondary battery stores electrical energy by utilizing a chemical reaction. Accordingly, its charging and discharging characteristics significantly vary with environmental factors, temperature conditions in particular. More specifically, at low temperatures, the chemical reaction has a significantly decreased level of reactivity and the secondary battery may not be able to discharge sufficient electric power. As such, in early winter morning or in cold climate areas, the secondary battery can only supply decreased electric power, and in a hybrid vehicle configured to have a motor generator crank the engine to start, for example its vehicular system including the engine cannot be started. Such temperature dependence is exhibited more significantly in particular by a lithium ion battery than a nickel metal hydride battery, as the former has a higher energy density than the latter.

Furthermore the electric double layer capacitor is also temperature-dependent and can only supply decreased electric power at low temperatures.

Accordingly, there has been proposed a controlling method for charging and discharging. More specifically, after an ignition-off command is received, a temperature condition that would be assumed when a subsequent ignition-on command is received is estimated, and a power storage device is charged to a higher SOC to ensure that a vehicular system can also start under the estimated temperature condition.

For example, Japanese Patent Laying-Open No. 11-355967 discloses a battery control apparatus improving an engine's startability at low temperatures. This battery control apparatus includes: temperature estimation means for estimating the temperature that a battery has when an engine next starts; SOC setting means setting the battery's SOC corresponding to the battery's estimated value in temperature for obtaining a predetermined output from the battery; SOC detection means for detecting the battery's SOC; and means for controlling charging and discharging the battery to allow the battery's detected SOC value to attain the set SOC value. The temperature estimation means estimates the temperature that the battery has when the engine next starts, as based on the value of an outside air temperature detected when the engine was previously started. The battery control apparatus can provide an output required to start the engine if the battery has a low temperature when the engine is next started.

However, while Japanese Patent Laying-Open No. 11-355967 discloses that a temperature that the battery has when the engine next starts is estimated from the value of an outside air temperature detected when the engine was previously started, the publication does not specifically disclose how the temperature that the battery has when the engine next starts is estimated from the value of the outside air temperature detected when the engine was previously started.

Thus if there is some correlation between the value of the outside air temperature detected when the engine was previously started and the temperature that the battery has when the engine next starts, it has been difficult for a skilled person to implement the battery control apparatus of Japanese Patent Laying-Open No. 11-355967.

DISCLOSURE OF THE INVENTION

The present invention has been made to solve such problem and it contemplates an apparatus and method for the vehicle of interest for controlling charging and discharging a power storage device as well as estimating an optimal power storage temperature to ensure that a vehicular system having been shut down restarts.

The present invention in one aspect provides an apparatus controlling charging and discharging a rechargeable power storage device mounted in a vehicle, comprising: means for obtaining outside air temperature representing a temperature outside the vehicle; means for obtaining estimated power storage temperature based on the outside air temperature obtained by the means for obtaining outside air temperature, the estimated power storage temperature representing an estimated value of a temperature that the power storage device has when an ignition-on command is received to restart a vehicular system, the means for obtaining estimated power storage temperature having the estimated power storage temperature stored therein in association with the outside air temperature; means for obtaining actual power storage temperature representing an actual value of a temperature of the power storage device; and means for learning, updating a relationship between the outside air temperature and the estimated power storage temperature in the means for obtaining estimated power storage temperature, as based on an error between the estimated power storage temperature previously obtained by the means for obtaining estimated power storage temperature and the actual power storage temperature obtained when the ignition-on command is received.

In accordance with the present invention the means for obtaining estimated power storage temperature obtains estimated power storage temperature based on the outside air temperature obtained by the means for obtaining outside air temperature. The estimated power storage temperature is an estimated value of a temperature that the power storage device will have when an ignition-on command is received to restart a vehicular system. Means for learning updates a relationship between the outside air temperature and the estimated power storage temperature in the means for obtaining estimated power storage temperature, as based on an error between the estimated power storage temperature previously obtained by the means for obtaining estimated power storage temperature and the actual power storage temperature obtained when the ignition-on command is received. As the means for learning repeatedly performs such a process, the relationship between the outside air temperature and the estimated power storage temperature is optimized for the vehicle of interest. The temperature that the power storage device has when a command to restart a vehicular system is received can thus be optimally estimated from outside air temperature.

Preferably, the means for learning updates the relationship to associate a value obtained from a function including the estimated power storage temperature and the actual power storage temperature with the outside air temperature used to obtain that estimated power storage temperature.

Preferably, the apparatus controlling charging and discharging a power storage device further comprises: means for obtaining SOC of the power storage device; and means for controlling an amount charged into/discharged from the power storage device to maintain the SOC obtained by the means for obtaining SOC within a predetermined control range in accordance with the estimated power storage temperature.

Preferably, the means for obtaining estimated power storage temperature successively obtains the estimated power storage temperature while the vehicular system is active.

Preferably, the means for controlling an amount charged/discharged further includes means for converting the SOC obtained by the means for obtaining SOC into a corrected SOC in accordance with the estimated power storage temperature for controlling charging and discharging.

Preferably, the vehicle includes an engine configured to be capable of driving generation means for charging the power storage device and the engine is configured to be started by electric power discharged from the power storage device.

Preferably, the means for controlling an amount charged/discharged includes means for starting the engine to allow the SOC to be within the predetermined control range if the SOC is not within the predetermined control range when the ignition-off command is received.

Preferably, the means for obtaining estimated power storage temperature includes an estimated power storage map having more than one component of estimated power storage temperature stored therein with the outside air temperature serving as a parameter.

Preferably, the estimated power storage map further has in addition to the outside air temperature as a further parameter at least one of: a time zone in which the ignition-off command is received; the actual power storage temperature obtained when the previous ignition-on command is immediately previously received; and a period of duration for which the vehicular system is active.

The present invention in another aspect provides an apparatus controlling charging and discharging a rechargeable power storage device mounted in a vehicle, comprising: a unit obtaining outside air temperature representing a temperature outside the vehicle; a unit obtaining actual power storage temperature representing an actual value of a temperature of the power storage device; and a control device including a storage unit, wherein: the control device obtains estimated power storage temperature based on the outside air temperature obtained by the unit obtaining outside air temperature, the estimated power storage temperature representing an estimated value of a temperature that the power storage device has when an ignition-on command is received to restart a vehicular system; the storage unit has the estimated power storage temperature stored therein in association with the outside air temperature; and the control device updates a relationship between the outside air temperature and the estimated power storage temperature stored in the storage unit, as based on an error between the estimated power storage temperature previously obtained and the actual power storage temperature obtained when the ignition-on command is received.

The present invention in still another aspect provides a method for controlling charging and discharging a rechargeable power storage device mounted in a vehicle, comprising the steps of: obtaining an outside air temperature representing a temperature outside the vehicle; referring to a previously stored relationship between estimated power storage temperature and the outside air temperature, as based on the outside air temperature obtained, to obtain estimated power storage temperature representing an estimated value of a temperature that the power storage device has when an ignition-on command is received to restart a vehicular system; obtaining actual power storage temperature representing an actual value of a temperature of the power storage device; and updating the previously stored relationship between the estimated power storage temperature and the outside air temperature, as based on an error between the estimated power storage temperature previously obtained and the actual power storage temperature obtained when the ignition-on command is received.

The present invention can thus implement an apparatus controlling charging and discharging a power storage device, that can estimate an optimal estimated power storage temperature for each vehicle to ensure that a vehicular system having been shut down restarts.

BRIEF DESCRIPTION OF THE DRAWINGS

FIG. 2 shows one example of an estimated battery temperature map.

FIG. 8 shows one example of an estimated battery temperature map in accordance with a first exemplary variation of the first embodiment of the present invention.

FIG. 9 shows one example of an estimated battery temperature map in accordance with a second exemplary variation of the first embodiment of the present invention.

FIG. 10 shows one example of an estimated battery temperature map in accordance with a third exemplary variation of the first embodiment of the present invention.

BEST MODES FOR CARRYING OUT THE INVENTION

Figure 1:
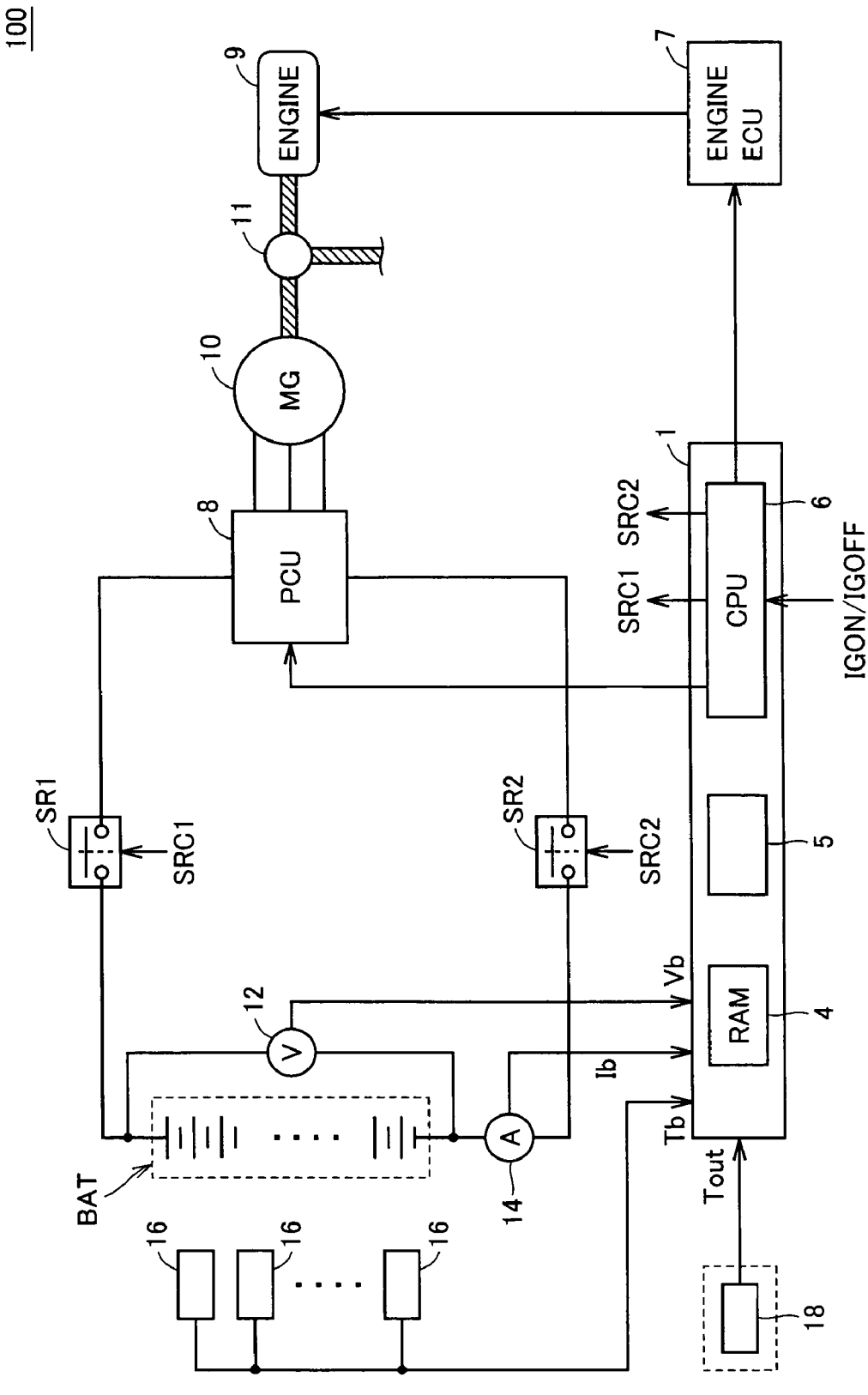
FIG. 1 schematically shows a configuration of a vehicle having mounted therein an apparatus controlling charging and discharging a power storage device in accordance with a first embodiment of the present invention.

Hereinafter reference will be made to the figures to describe the present invention in embodiments more specifically. In the figures, identical or like components are denoted by identical reference characters and will not be described repeatedly.

First Embodiment

With reference to FIG. 1, a vehicle 100 is a hybrid vehicle including a secondary battery BAT, system relays SR1 and SR2, a power control unit (PCU) 8, a motor generator (MG) 10, an engine 9, and a power split device 11.

Secondary battery BAT is a set of batteries configured of a plurality of series connected battery modules each formed of a plurality of battery cells integrated together. By way of example, it is configured of a lithium ion battery, a nickel metal hydride battery or the like. Secondary battery BAT has its positive and negative electrodes connected via system relays SR1 and SR2, respectively, to PCU 8 and is charged or discharged in amounts, respectively, as controlled by PCU 8.

When vehicle 100 is in a running mode, PCU 8 receives direct current electric power (discharged electric power) from secondary battery BAT, converts it into alternate current electric power and supplies it to motor generator 10. When vehicle 100 is regeneratively braked, PCU 8 converts alternate current electric power generated by motor generator 10 into direct current electric power (charged electric power) and supplies it to secondary battery BAT to recover kinetic energy of vehicle 100 as electrical energy. Furthermore, PCU 8 may include a boost/buck converter (a DC/DC converter) that steps up direct current voltage received from secondary battery BAT and steps down direct current voltage received from motor generator 10.

Note that regenerative braking as referred to herein includes: braking accompanied by power-generating braking when a driver of a hybrid vehicle operates the foot brake; not operating the foot brake, while releasing the accelerator pedal while the vehicle is traveling, to reduce vehicular speed (or stop acceleration) while providing power-generating braking; and the like.

Motor generator 10 is for example a 3-phase alternate current rotating electric machine. It receives alternate current electric power from PCU 8 to work as a motor to generate a driving power causing vehicle 100 to travel, while it also receives a driving power transmitted from engine 9 or a wheel (not shown) to work as an electric power generator to generate electric power from the kinetic energy of vehicle 100 to charge secondary battery BAT. In other words, motor generator 10 is configured to be drivable by engine 9.

Engine 9 generates a driving power from combusted gasoline, light oil, methanol or similar fuel and provides the generated driving power via power split device 11 to a wheel (not shown) or motor generator 10.

Power split device 11 is a device communicating a driving power between motor generator 10, engine 9 and a wheel (not shown). By way of example, it is configured of a single pinion type planetary gear device.

Furthermore, in vehicle 100 in the first embodiment of the present invention, when engine 9 starts, motor generator 10 receives electric power discharged from secondary battery BAT to generate a driving power to crank (or rotatively drive) engine 9. As engine 9 is cranked, fuel is injected and ignited and engine 9 establishes continuous rotation. Such cranking of engine 9 by motor generator 10 is implemented by operating power split device 11 to transmit to engine 9 the driving power generated by motor generator 10.

As described above, the electric power discharged from secondary battery BAT is used by motor generator 10 to generate a driving power, whereas the electric power charging secondary battery BAT is generated by motor generator 10 as it receives a driving power from engine 9 or receives the kinetic energy of vehicle 100. In other words, controlling charging and discharging secondary battery BAT is implemented as an adjusting operation for discharged power and/or charged power by controlling motor generator 10 (or PCU 8) and/or engine 9.

Furthermore, vehicle 100 includes a control device 1, a voltage measurement unit 12, a current measurement unit 14, a battery temperature measurement unit 16, an outside air temperature measurement unit 18, and an engine ECU 7.

Control device 1 is connected to voltage measurement unit 12 measuring actual voltage Vb of secondary battery BAT, current measurement unit 14 measuring actual current Ib of secondary battery BAT, and battery temperature measurement unit 16 measuring actual battery temperature Tb of secondary battery BAT, and control device 1 successively obtains a state of charge (SOC) indicating an amount remaining in secondary battery BAT, as based on secondary battery BAT's actual voltage Vb, actual current Ib and actual battery temperature Tb. In the following description, by way of example, the SOC will be represented in percentages with secondary battery BAT's fully charged amount serving as a reference (i.e., 100%). Such representation in percentages may be replaced with an SOC represented for example by an absolute value (Ah) of a remaining amount.

Secondary battery BAT's SOC can be obtained by employing a variety of well known techniques. In the present embodiment, by way of example, control device 1 successively detects SOC by adding together a provisional SOC calculated from actual voltage Vb in open circuit (or an open-circuit voltage value) and a compensatory SOC calculated from a cumulative value of actual current Ib. Furthermore, from secondary battery BAT's SOC detected, control device 1 calculates electric power Wout allowed to be discharged and electric power Win allowed to be charged. Electric power Wout allowed to be discharged and electric power Win allowed to be charged are limit values for discharged power and charged power, respectively, at each time point that are applied for a short time, as defined by a limit in terms of chemical reaction.

Furthermore, control device 1 is configured to receive an ignition-off command IGOFF and an ignition-on command IGON for shutting down and starting, respectively, a vehicular system. The vehicular system as referred to herein includes each device, including engine 9, configuring vehicle 100, and in particular, includes devices operating directly or indirectly on electric power output from secondary battery BAT.

Furthermore, control device 1 is also connected to outside air temperature measurement unit 18 measuring temperature Tout of air outside vehicle 100. Based on outside air temperature Tout measured by outside air temperature measurement unit 18, control device 1 obtains an estimated battery temperature #Tb indicating an estimated value of a temperature that secondary battery BAT will have when ignition-on command IGON is received to restart the vehicular system.

Furthermore, when the vehicular system is active, control device 1 successively obtains estimated battery temperature #Tb, and controls an amount charged into/discharged from secondary battery BAT in order to maintain its SOC within a predetermined control range based on estimated battery temperature #Tb. More specifically, control device 1 issues a control command to PCU 8 to control the amount charged into/discharged from secondary battery BAT and also controls via engine ECU 7 the driving power generated by engine 9. Note that engine ECU 7 operates in response to a control command issued from control device 1 to adjust an amount of fuel or the like supplied to engine 9 to control the driving power generated by engine 9 (or its rotation speed).

Furthermore, when control device 1 receives ignition-on command IGON, control device 1 activates system relay commands SRC1, SRC2 to drive system relays SR1, SR2, respectively, on to electrically connect secondary battery BAT and PCU 8 together. In contrast, when control device 1 receives ignition-off command IGOFF, control device 1 deactivates system relay commands SRC1, SRC2 to turn off system relays SR1, SR2, respectively (i.e., the system is shut down).

Control device 1 is configured for example of an electrical control unit (ECU) and the like and includes a random access memory (RAM) 4, an estimated battery temperature map 5, and a central processing unit (CPU) 6.

CPU 6 performs a variety of processes in control device 1, as described above, in accordance with a program, a map and the like previously stored in RAM 4, and obtains data as the processes are performed. CPU 6 stores the data to RAM 4.

Estimated battery temperature map 5 is configured in the form for example of electrical erasable and programmable read only memory (EEPROM) or a similar data-writable, non-volatile storage medium. Estimated battery temperature map 5 stores estimated battery temperature #Tb therein in association with outside air temperature Tout. More specifically, estimated battery temperature map 5 has a plurality of components of estimated battery temperature #Tb stored therein with outside air temperature Tout serving as a parameter. CPU 2 refers to estimated battery temperature map 5 and obtains therefrom estimated battery temperature #Tb corresponding to outside air temperature Tout obtained from outside air temperature measurement unit 18.

With reference to FIG. 2; estimated battery temperature map 5 has estimated battery temperature #Tb stored therein in association with outside air temperature Tout. FIG. 2 shows, by way of example, outside air temperature Tout defined for every 5° C. in a range of –30° C. to 30° C. However, estimated battery temperature map 5 is not limited to such configuration. Estimated battery temperature map 5 may be configured considering: how precisely charging and discharging secondary battery BAT of interest is controlled; in what environment it is used; and the like. Note that, as will be described later, estimated battery temperature map 5 has stored therein estimated battery temperature #Tb updated as a learning process is performed, and for an initial value therefor, the map may have stored therein a value obtained experimentally in advance.

Furthermore, CPU 6 performs the learning process updating a relationship between outside air temperature Tout and estimated battery temperature #Tb stored in estimated battery temperature map 5, as based on an error between estimated battery temperature #Tb as previously obtained and outside air temperature Tout obtained when the subsequent ignition-on command IGON is received. More specifically, a value of a component in estimated battery temperature map 5 is updated to a result value obtained from a function including estimated battery temperature #Tb and outside air temperature Tout so that the value is associated with outside air temperature Tout used (or set as a parameter) to obtain that estimated battery temperature #Tb.

The FIG. 1 configuration and the present invention have a relationship, as follows: Control device 1 corresponds to "an apparatus for controlling charging and discharging a power storage device". Furthermore, CPU 6 implements "means for obtaining outside air temperature", "means for obtaining actual power storage temperature", "means for learning", and "means for controlling an amount charged into/discharged". CPU 6 and estimated battery temperature map 5 implement "means for obtaining estimated power storage temperature". Furthermore, estimated battery temperature #Tb corresponds to "estimated power storage temperature". Actual battery temperature Tb corresponds to "actual power storage temperature". Estimated battery temperature map 5 corresponds to an "estimated power storage temperature map".

Figure 3:
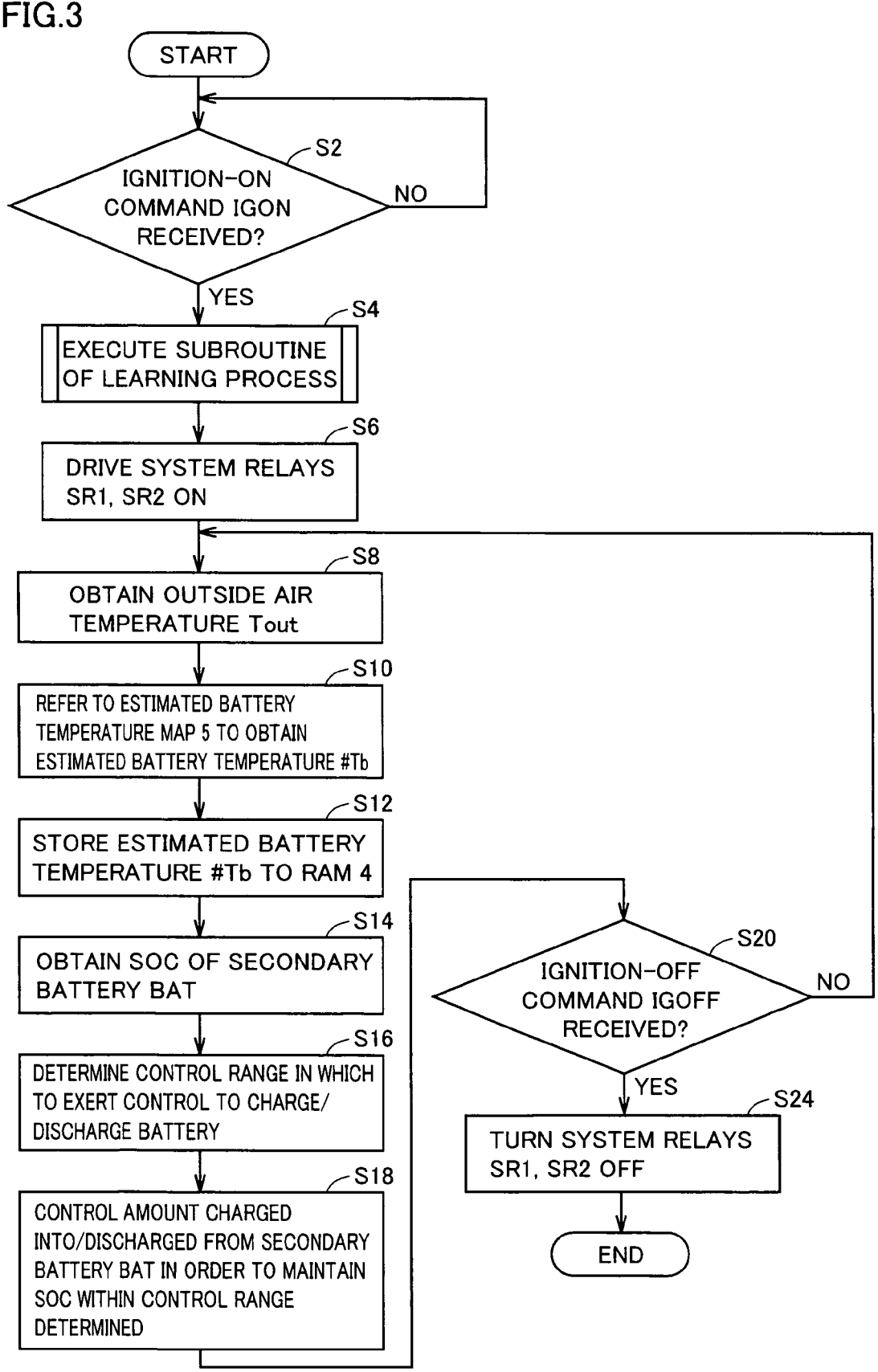
FIG. 3 generally shows a flow of a process performed by the apparatus controlling charging and discharging the power storage device in accordance with the first embodiment of the present invention.

Reference will now be made to FIG. 3 to describe a general flow of a process performed by an apparatus for controlling charging and discharging a power storage device in accordance with the first embodiment of the present invention.

Initially CPU 6 determines whether ignition-on command IGON is received (step S2). If ignition-on command IGON is not received (NO at step S2), CPU 6 waits until ignition-on command IGON is received (step S2).

If ignition-on command IGON is received (YES at step S2), CPU 6 performs a subroutine of a learning process (step S4), and CPU 6 activates system relay commands SRC1, SRC2 to drive system relays SR1, SR2 on (step S6).

CPU 6 obtains outside air temperature Tout from outside air temperature measurement unit 18 (step S8) and refers to estimated battery temperature map 5 to obtain estimated battery temperature #Tb corresponding to outside air temperature Tout obtained in step S8 (step S10). Furthermore, CPU 6 stores to RAM 4 the estimated battery temperature #Tb obtained at step S10 (step S12).

Furthermore, CPU 6 obtains secondary battery BAT's SOC based on secondary battery BAT's actual voltage Vb, actual current Ib, actual battery temperature Tb and the like (step S14), and from the obtained estimated battery temperature #Tb, CPU 6 determines a control range in which to exert control to charge/discharge secondary battery BAT (step S16). Furthermore, CPU 6 controls an amount charged into/discharged from secondary battery BAT in order to maintain its SOC within the control range determined in step S16 (step S18).

Subsequently CPU 6 determines whether ignition-off command IGOFF is received (step S20). If ignition-off command IGOFF is not received (NO at step S20), CPU 6 repeats steps S8-S20.

If ignition-off command IGOFF is received (YES at step S20), CPU 6 deactivates system relay commands SRC1, SRC2 to turn off system relays SR1, SR2 (step S24) and thus end the process.

As described above, after ignition-on command IGON is received while the vehicular system is active CPU 6 successively obtains estimated battery temperature #Tb (step S10), since it is impossible to predict at which time point (or timing of processing) ignition-off command IGOFF is received, and accordingly, charging and discharging secondary battery BAT is controlled to ensure that the vehicular system can be restarted, whichever time point ignition-off command IGOFF may be received at.

Figure 4:
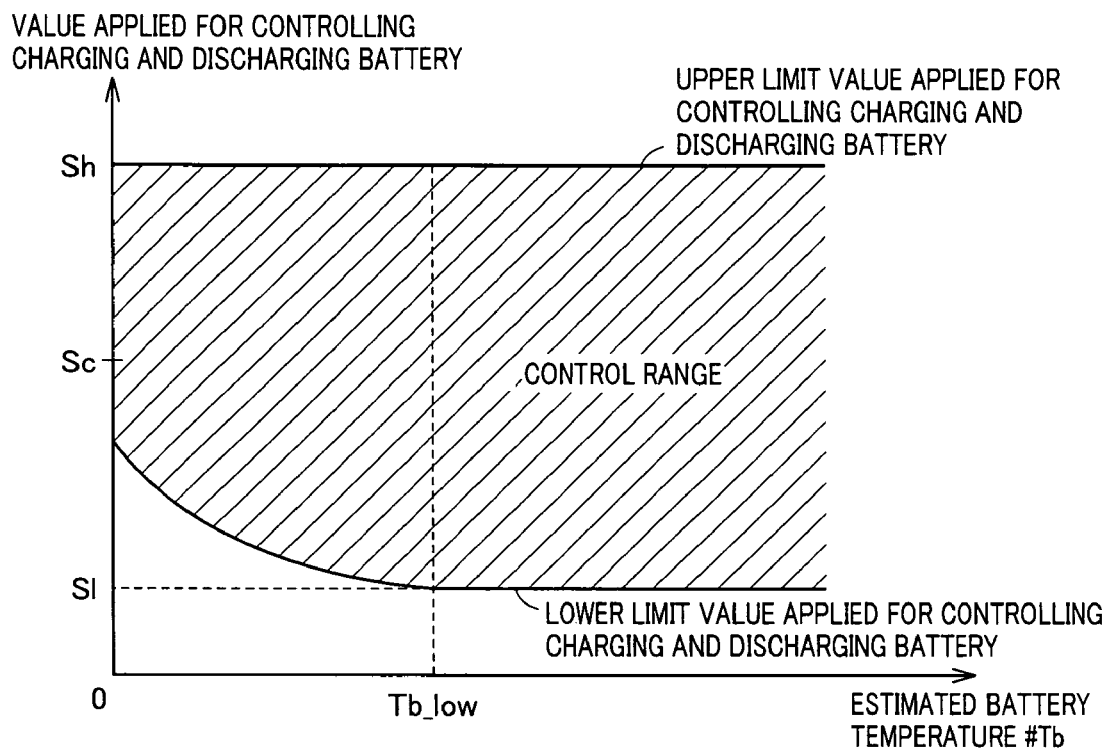
FIG. 4 is a diagram for illustrating how a control range in which to exert control to charge/discharge the power storage device varies according to the battery's estimated temperature.

Reference will now be made to FIG. 4 to describe how the control range in which to exert control to charge/discharge the battery varies based on estimated battery temperature.

CPU 6 controls charging and discharging in order to maintain the battery BAT SOC within a predetermined control range. The control range in which to exert control to charge/discharge the battery is defined by upper and lower limit values applied for controlling charging and discharging the battery. The upper and lower limit values are set to include a center value Sc applied for controlling charging and discharging the battery. CPU 6 varies the lower limit value applied for controlling charging and discharging the battery, as based on estimated battery temperature #Tb obtained. More specifically, if estimated battery temperature #Tb is higher than a threshold value Tb_low for estimated low temperature, CPU 6 controls charging and discharging within a range of a lower limit value Sl to an upper limit value Sh. If estimated battery temperature #Tb does not exceed threshold value Tb_low for estimated low temperature, the lower limit value applied for controlling charging and discharging the battery is changed to a value larger than lower limit value Sl.

Thus CPU 6 maintains secondary battery BAT's SOC within a higher range to ensure that the vehicular system restarts.

Furthermore, the lower limit value applied for controlling charging and discharging the battery may be charged, depending on the driver's operation, to a value larger than lower limit value Sl as normally applied for controlling charging and discharging the battery. Such configuration allows controlling charging and discharging the battery to be adjusted at a relatively large degree of freedom when a vehicle runs in a different driving pattern than normal, such as traveling to a cold climate area.

Hereinafter the subroutine of the learning process (the FIG. 3 step S4) will more specifically be described.

Subroutine of Learning Process

As has been described above, CPU 6 updates a relationship between outside air temperature Tout and estimated battery temperature #Tb stored in estimated battery temperature map 5, as based on an error between estimated battery temperature #Tb as previously obtained and outside air temperature Tout obtained when the subsequent ignition-on command IGON is received.

A vehicle used daily such as for commutation, business and the like is often used in relatively analogous driving patterns. When the vehicle is used in such a manner, its vehicular system is kept inactive for analogous periods. Accordingly the battery also shows relatively analogous tendencies in what characteristic actual battery temperature Tb exhibits as it drops after ignition-off command IGOFF is received before ignition-on command IGON is again received.

Accordingly the present invention in the first embodiment provides an apparatus controlling charging and discharging a power storage device, that stores in estimated battery temperature map 5 a plurality of components of estimated battery temperature #Tb, stratified by outside air temperature Tout affecting the value of actual battery temperature Tb, and that modifies the stored value of estimated battery temperature #Tb to match actual battery temperature Tb.

Figure 5:
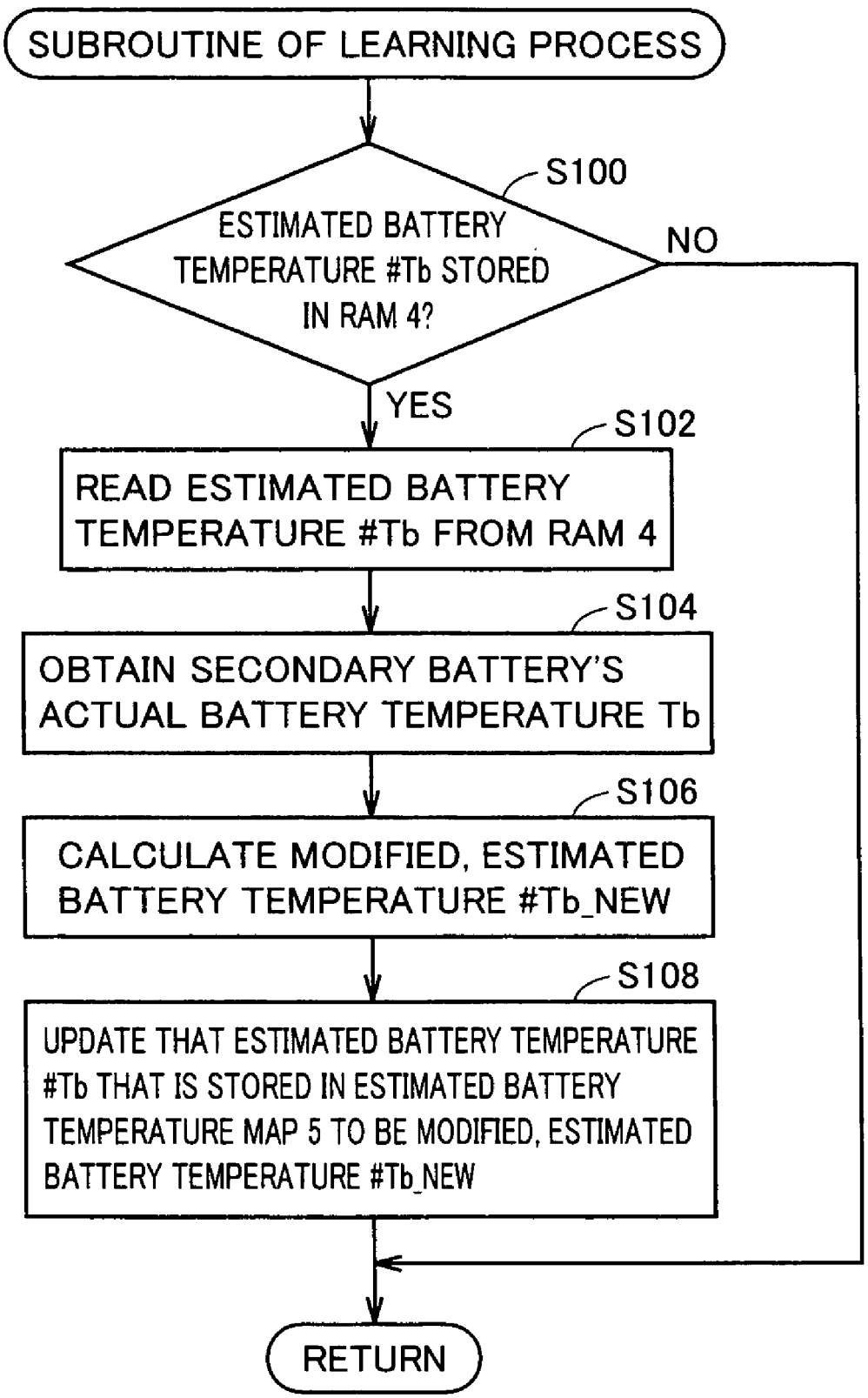
FIG. 5 shows a flow of a process of a subroutine of a learning process.

With reference to FIG. 5, the learning process has the subroutine providing a process in a flow, as will be described hereinafter.

Initially, CPU 6 determines whether RAM 4 has estimated battery temperature #Tb stored therein (step S100). If RAM 4 does not have estimated battery temperature #Tb stored therein (NO at step S100), CPU 6 returns to a former process.

If RAM 4 has estimated battery temperature #Tb stored therein (YES at step S100), CPU 6 reads estimated battery temperature #Tb from RAM 4 (step S102). Note that if estimated battery temperature #Tb read from RAM 4 for example exceeds a predetermined range, then, to avoid updating estimated battery temperature map 5 by an outlier, the control may interrupt a subsequent process and return to a former process.

Subsequently, CPU 6 obtains the secondary battery's actual battery temperature Tb from battery temperature measurement unit 16 (step S104), and CPU 100 calculates a modified, estimated battery temperature #Tb_NEW from the read estimated battery temperature #Tb and the obtained actual battery temperature Tb (step S106). More specifically, CPU 6 calculates modified, estimated battery temperature #Tb_NEW=$\alpha \times$estimated battery temperature #Tb+$(1-\alpha)\times$ actual battery temperature Tb. Note that a ($0<\alpha<1$) is a learning factor. For a learning factor having a smaller value, a larger learning effect is achieved, i.e., modifying estimated battery temperature #Tb becomes more responsive to a value of actual battery temperature Tb.

Furthermore, CPU 6 updates the estimated battery temperature #Tb of interest stored in estimated battery temperature map 5 to be the modified, estimated battery temperature #Tb_NEW obtained (step S108), and CPU 6 returns to a former process.

Figure 6:
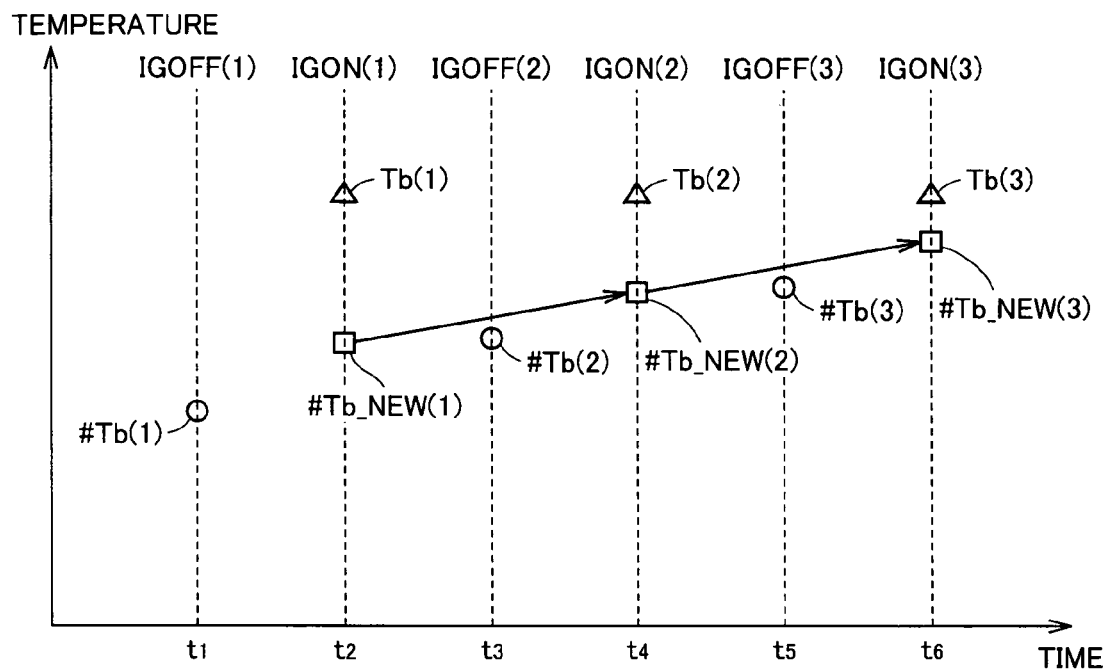
FIG. 6 is a diagram for illustrating how the battery's estimated temperature varies with time as the learning process is performed.

With reference to FIG. 6, as the learning process is performed, estimated battery temperature #Tb varies with time, as will be described hereinafter. Note that FIG. 6 shows how estimated battery temperature #Tb corresponding to outside air temperature Tout of a particular value in estimated battery temperature map 5 (for example in FIG. 2 when outside air temperature Tout is 0° C.) varies with time, by way of example.

In accordance with the present embodiment the vehicular system is shut down and started repeatedly in accordance with ignition-off command IGOFF and ignition-on command IGON alternately received. Note that in the following description it is assumed that outside air temperature Tout has an approximately constant value (e.g., 0° C.) when ignition-off command IGOFF is received (i.e., at times t1, t3, t5).

At time t1, ignition-off command IGOFF(1) is received for a first time. In response, CPU 6 refers to estimated battery temperature map 5 to obtain estimated battery temperature #Tb(1) corresponding to outside air temperature Tout obtained at time t1. Subsequently at time t2 ignition-on command IGON(1) is received for a first time. In response, CPU 6 obtains actual battery temperature Tb(1) at time t2, and calculates a modified, estimated battery temperature #Tb_NEW(1) from estimated battery temperature #Tb(1) and actual battery temperature Tb(1) for ignition-on command IGON(1) received for the first time. Furthermore, CPU 6 updates in estimated battery temperature map 5 a value corresponding to outside air temperature Tout obtained at time t1 to the modified, estimated battery temperature #Tb_NEW(1).

At time t3, ignition-off command IGOFF(2) is received for a second time. In response, CPU 6 refers to estimated battery temperature map 5 to obtain estimated battery temperature #Tb(2) corresponding to outside air temperature Tout obtained at time t3. Herein, in estimated battery temperature map 5, outside air temperature Tout corresponds to a value that has been updated to estimated battery temperature #Tb_NEW(1), and estimated battery temperature #Tb(2) matches estimated battery temperature #Tb_NEW(1).

Subsequently at time t4 ignition-on command IGON(2) is received for a second time. In response, CPU 6 obtains actual battery temperature Tb(2) at time t4, and calculates a modified, estimated battery temperature #Tb_NEW(2) from estimated battery temperature #Tb(2) and actual battery temperature Tb(2) for ignition-on command IGON(2) received for the second time. Furthermore, CPU 6 updates in estimated battery temperature map 5 a value corresponding to outside air temperature Tout obtained at time t3 to be the modified, estimated battery temperature #Tb_NEW(2).

Subsequently a similar process is performed for ignition-off command IGOFF(3) and ignition-on command IGON(3) received for a third time.

Such learning process modifies estimated battery temperature #Tb stored in estimated battery temperature map 5, i.e., provides modified estimated battery temperature #Tb_NEW, in a direction to match actual battery temperature Tb.

In the above description, to help to understand the present invention, estimated battery temperature #Tb corresponding to one outside air temperature Tout stored in estimated battery temperature map 5 is noted to exemplify how estimated battery temperature #Tb varies with time. In practice, the learning process is performed independently by each unit of outside air temperature Tout (or by each stratified unit) as defined in estimated battery temperature map 5 in accordance with outside air temperature Tout obtained when ignition-off command IGOFF is received.

Figure 7:
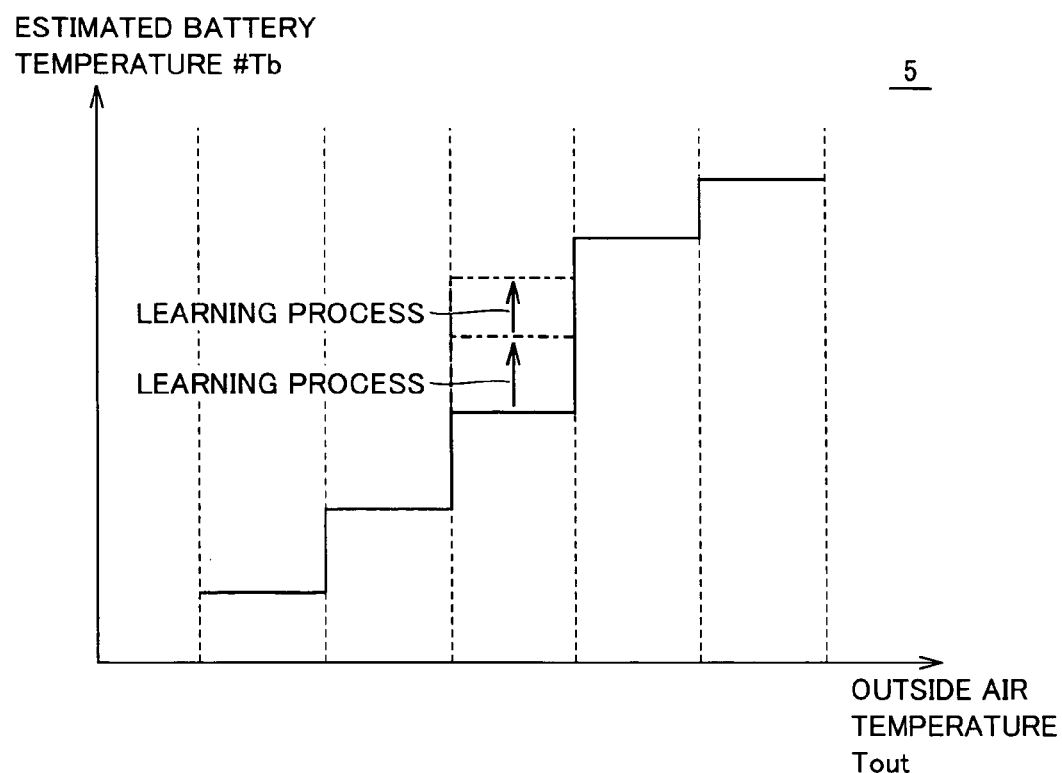
FIG. 7 is a diagram for illustrating how the battery's estimated temperature is updated in the estimated battery temperature map as the learning process is performed.

With reference to FIG. 7, as the learning process is performed, estimated battery temperature map 5 has estimated battery temperature #Tb updated in a process, as will be described hereinafter. Note that FIG. 7 represents estimated battery temperature #Tb stored in estimated battery temperature map 5, with an axis of abscissas representing outside air temperature Tout serving as a parameter.

Estimated battery temperature map 5 has a plurality of components of estimated battery temperature #Tb stored therein in association with its defined outside air temperature Tout (stratified). As has been described above, the learning control is executed by each unit of outside air temperature Tout (or by each stratified unit) independently. Accordingly, whenever the learning control is executed, one estimated battery temperature #Tb associated with one outside air temperature Tout will be updated.

In accordance with the present invention in the first embodiment, while estimated battery temperature #Tb corresponding to outside air temperature Tout obtained is obtained to control charging and discharging secondary battery BAT in order to maintain its SOC in a predetermined control range, estimated battery temperature map 5 is updated to have estimated battery temperature #Tb_NEW based on an error between estimated battery temperature #Tb previously obtained and actual battery temperature Tb obtained when ignition-on command IGON is received. Thus, estimated battery temperature #Tb in accordance with a driving pattern performed on a daily basis can be learnt at least for each outside air temperature Tout, and whenever ignition-on command IGON and ignition-off command IGOFF are repeated, estimated battery temperature map 5 can have its stored estimated battery temperature #Tb updated to a value adapted to the vehicle of interest. Thus, an optimal estimated battery temperature can be estimated for each vehicle, and an apparatus controlling charging and discharging a power storage device can be implemented that ensures that a vehicular system having been shut down restarts.

Furthermore, the present invention in the first embodiment ensures that a vehicular system having been shut down restarts, and thus it is not necessary to adopt second battery BAT that has excessive chargeable capacity against decreased temperature when the vehicular system restarts. Secondary battery BAT can thus have a capacity determined without considering power dischargeability in restarting the vehicular system. Secondary battery BAT can hence have a capacity determined by noting the vehicle's motive power performance or the like alone. The vehicle can thus mount therein secondary battery BAT optimized in capacity.

First Exemplary Variation

As described above, the present invention in the first embodiment illustrates an estimated battery temperature map having a plurality of components of estimated battery temperature #Tb stored therein in association with outside air temperature Tout. Alternatively, the map may have a plurality of components of estimated battery temperature #Tb stored therein in association with outside air temperature Tout and in addition thereto another parameter.

For example, a vehicle used for commutation has its vehicular system having been shut down in a time zone and inactive for a period of time before departing for work, and having been shut down in a different time zone and inactive for a different period of time before departing from work. As such, while outside air temperature Tout is the same, actual battery temperature Tb may vary with when the vehicular system restarts. More specifically, when the vehicle departs for work (e.g., in the morning) the vehicular system has been inactive since ignition-off command IGOFF was received in the previous day when the vehicle arrived home from work (e.g., in the evening). In contrast, when the vehicle departs from work (e.g., in the evening), the vehicular system has been inactive since ignition-off command IGOFF was received in the same day when the vehicle arrived at work (e.g., in the morning).

Accordingly, an estimated battery temperature map 5A may be provided that has the components of estimated battery temperature #Tb stored therein in association with outside air temperature Tout and in addition thereto a time zone in which ignition-off command IGOFF is received.

With reference to FIG. 8, estimated battery temperature map 5A has the components of estimated battery temperature #Tb stored therein such that outside air temperature Tout and in addition a time zone in which ignition-off command IGOFF is received (e.g., morning, afternoon, evening, and late night and early morning) serve as parameters.

When such a vehicle used for commutation, as described above, with estimated battery temperature map 5A applied thereto, arrives home from work and accordingly receives ignition-off command IGOFF, charging and discharging the battery is controlled by estimated battery temperature #Tb defined by outside air temperature Tout obtained at the time, and a time zone "evening". In contrast, when the vehicle arrives at work and accordingly receives ignition-off command IGOFF, charging and discharging the battery is controlled by estimated battery temperature #Tb defined by outside air temperature Tout obtained at the time, and a time zone "morning".

Furthermore, the above described learning process is performed on a time zone basis, and a result of the learning process will clearly be distinguished by when the vehicle arrives at work and when it arrives home from work, and thus reflected.

Note that in addition to the above described time zones, additional strata such as: weekday; days immediately before weekend and holidays; weekend and holidays; and the like may further be adopted.

The present invention in the first embodiment in the first exemplary variation can achieve an effect of the first embodiment, as described above, and in addition thereto an effect of a learning process for different time zones. If a single vehicle is used in a plurality of different driving patterns, the battery's estimated temperature can be learnt for each driving pattern.

Second Exemplary Variation

A parameter associated with estimated battery temperature #Tb may be actual battery temperature Tb that secondary battery BAT had when the previous ignition-off command IGOFF was received.

With reference to FIG. 9, an estimated battery temperature map 5B has the components of estimated battery temperature #Tb stored therein such that outside air temperature Tout and in addition thereto actual battery temperature Tb that secondary battery BAT had when the previous ignition-off command IGOFF was received serve as parameters.

As has been described above, a vehicle used for commutation or the like will be used in two driving patterns for going to work and leaving work, respectively. If at least these two driving patterns can be distinguished, charging and discharging the battery can appropriately be controlled and the learning process can appropriately be performed. In particular, the driving patterns for going to work and leaving work, respectively, are repeated alternately. Accordingly, on the basis of a difference that actual battery temperature Tb had when the previous ignition-off command IGOFF was received, a decision can be made on which driving pattern a driving pattern is.

The present invention in the first embodiment in the second exemplary variation can provide an effect of the first embodiment, as described above, and in addition thereto an effect of a learning process for different actual battery temperature Tb that a battery had when the previous ignition-off command IGOFF was received. If a single vehicle is used in a plurality of driving patterns, an estimated battery temperature can be learnt for each driving pattern.

Third Exemplary Variation

A parameter associated with estimated battery temperature #Tb may be a period of duration for which a vehicular system is active.

With reference to FIG. 10, an estimated battery temperature map 5C has the components of estimated battery temperature #Tb stored therein such that outside air temperature Tout and in addition thereto a period of duration for which the vehicular system is active serve as parameters. Note that the period of duration for which the vehicular system is active is obtained by measuring a period of time that has elapsed up to the present since the previous ignition-on command IGON was received.

For example, if a vehicle used on weekdays for commutation for a relatively small distance is used for example on a holiday to go for a long drive, its vehicular system operates for a period of time different in length from that of weekend, and it can be determined that the vehicle is in a different pattern from the other.

Thus distinguishing driving patterns allows charging and discharging the battery to be appropriately controlled, and the learning process to be appropriately performed.

The present invention in the first embodiment in the third exemplary variation can provide an effect of the first embodiment, as described above, and in addition thereto an effect of a learning process by a distinctive period of duration for which a vehicular system is active. If a single vehicle is used in a plurality of driving patterns, an estimated battery temperature can be learnt for each driving pattern.

Note that a three or four dimensional estimated battery temperature map may be used that has combined the parameters described in the first embodiment in the first to third exemplary variations. Furthermore any parameter other than those described above may be used that can identify a plurality of driving patterns.

Second Embodiment

The present invention in the first embodiment has been described for a configuration controlling charging and discharging secondary battery BAT, in which a lower limit value applied for the controlling is varied based on estimated battery temperature #Tb obtained. The present invention in a second embodiment will be described for a configuration converting an actual SOC value to a corrected SOC for the controlling based on estimated battery temperature #Tb obtained.

Generally, hybrid vehicles and other similar motored vehicles often have an other type of controlling and function than controlling charging and discharging secondary battery BAT, that utilizes the lower limit value applied for controlling charging and discharging the battery. Accordingly, the present invention in the second embodiment controls charging and discharging secondary battery BAT by converting secondary battery BAT's SOC to a corrected SOC based on obtained estimated battery temperature #Tb to allow the present invention to be applied to an existing system without varying the lower limit value applied for controlling charging and discharging the battery. More specifically, if it is necessary that the lower limit value applied for controlling charging and discharging the battery be varied to a higher value, the lower limit value applied for controlling charging and discharging the battery is not varied. Instead, secondary battery BAT's actual SOC is converted to a corrected SOC indicating a lower value to provide a substantially the same effect.

The present invention in the second embodiment provides an apparatus controlling charging and discharging a power storage device, that is similar to that described in the first embodiment and shown in FIG. 1. Accordingly it will not be described in detail. Note that in the present invention in the second embodiment CPU 6 implements a "means for converting SOC".

Figure 11:
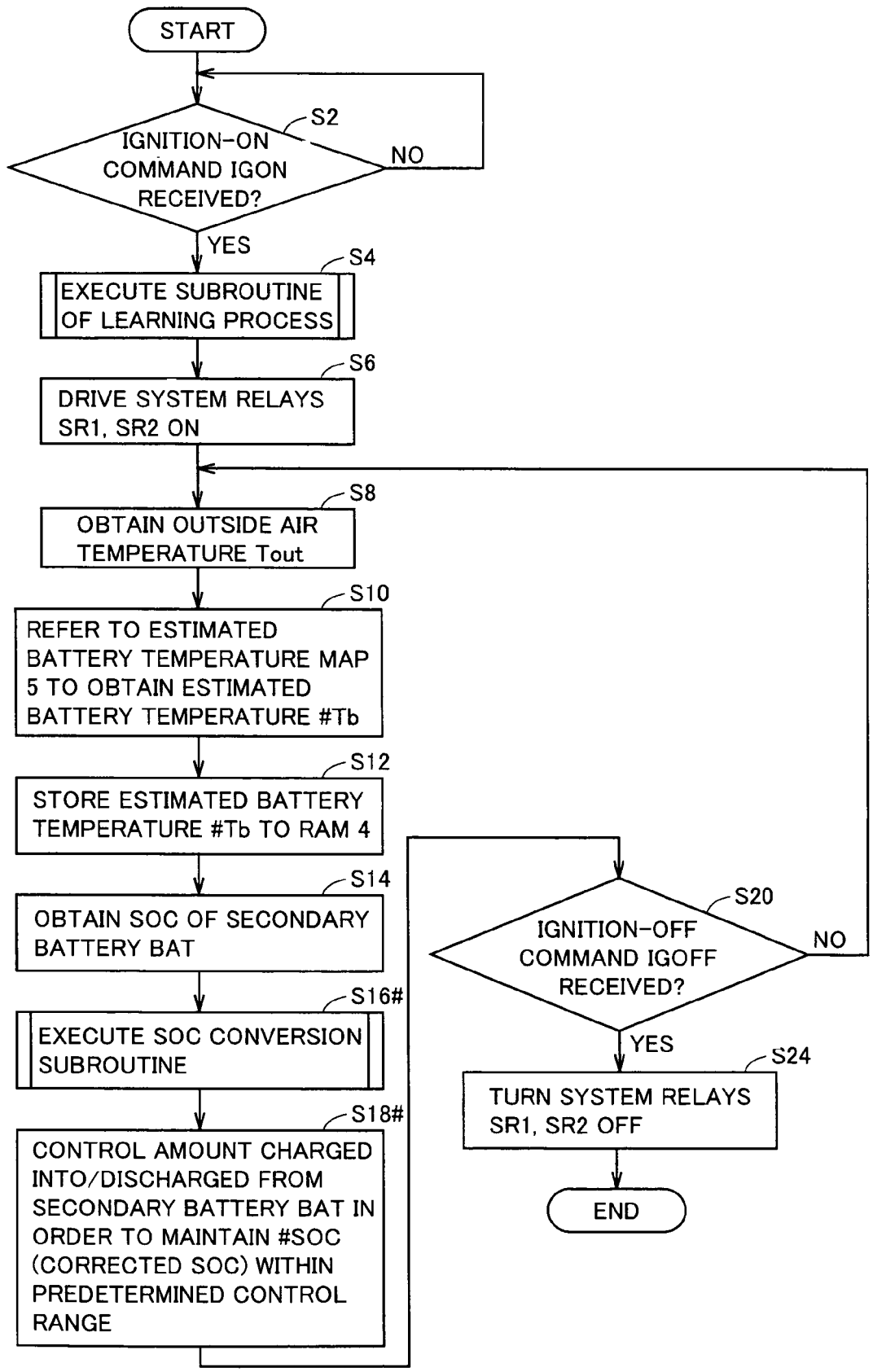
FIG. 11 generally shows a flow of a process performed by an apparatus controlling charging and discharging a power storage device in accordance with a second embodiment of the present invention.

With reference to FIG. 11, the apparatus controlling charging and discharging a power storage device in accordance with the present invention in the second embodiment provides a process generally having a flow as will be described hereinafter. This flow corresponds to that described in the first embodiment as shown in FIG. 3 having steps S16 and S18 replaced with steps S16# and S18#.

In step S16#, CPU 6 performs an SOC conversion subroutine. More specifically, CPU 6 converts secondary battery BAT's SOC that is obtained in step S14 to a corrected SOC (hereinafter also referred to as #SOC) in accordance with estimated battery temperature #Tb obtained at step S10. Furthermore, CPU 6 controls an amount charged into/discharged from secondary battery BAT to maintain #SOC (the corrected SOC) that has been obtained at step S16# within a predetermined control range (step S18#).

The remainder of the flow is similar to that of the flow of the process performed by the apparatus controlling charging and discharging a power storage device in accordance with the present invention in the first embodiment as shown in FIG. 3. Accordingly it will not be described repeatedly in detail.

SOC Conversion Subroutine

Figure 12A:
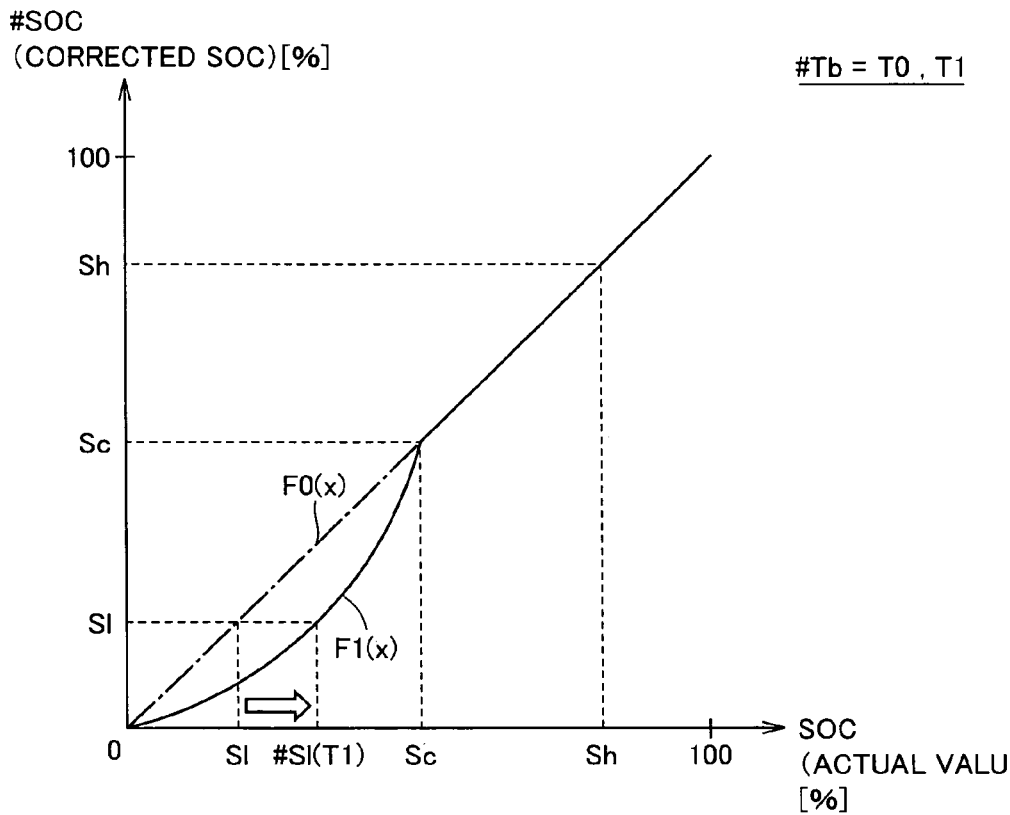
FIGS. 12A and 12B are diagrams for illustrating how the secondary battery's SOC (actual value) is converted to a corrected SOC.
Figure 12B:
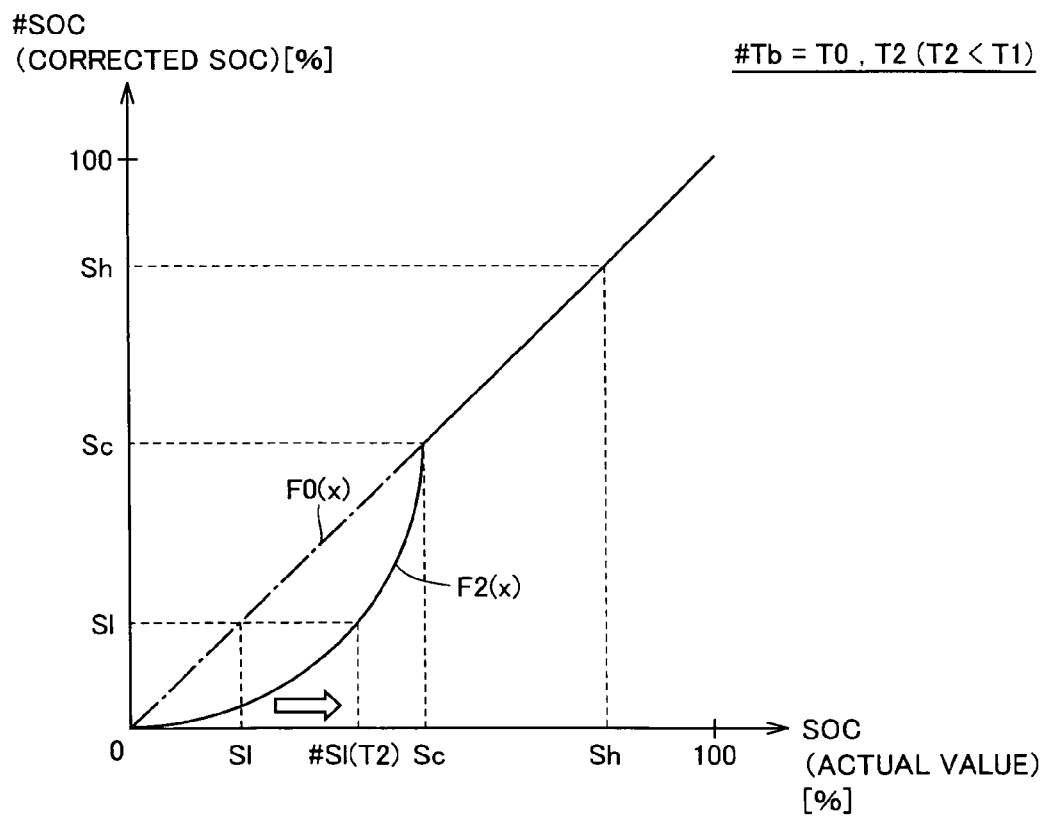

FIGS. 12A and 12B are diagrams for illustrating how secondary battery BAT's SOC (an actual value) is converted to #SOC (a corrected SOC). Note that in the following description, secondary battery BAT's SOC detected as based on actual voltage Vb, actual current Ib, actual battery temperature Tb and the like will also be referred to as an "SOC (actual value)" for the sake of clarification.

FIG. 12A shows an example for estimated battery temperature #Tb=T0, T1 (T1<Tb_low<T0). FIG. 12B shows an example for estimated battery temperature #Tb=T2 (T2<T1).

With reference to FIG. 12A, CPU 6 determines an SOC conversion function (by way of example, SOC conversion function F0($x$) or F1($x$)) in accordance with estimated battery temperature #Tb obtained, and CPU 6 uses the conversion function to convert an SOC (actual value) to a #SOC (corrected SOC).

More specifically, if estimated battery temperature #Tb is T0 higher than threshold value Tb_low for estimated low temperature, CPU 6 selects SOC conversion function F0($x$) that sets #SOC (corrected SOC) as the same value of SOC (actual value). Then, controlling charging and discharging the battery in accordance with #SOC (the corrected SOC) matches a result of controlling charging and discharging the battery in accordance with SOC (actual value).

In contrast, if estimated battery temperature #Tb is T1 lower than threshold value Tb_low for estimated low temperature, CPU 6 selects SOC conversion function F1($x$) for a range of SOC (actual value) smaller than center value Sc applied for controlling charging and discharging the battery, to convert SOC (actual value) to a lower #SOC (corrected SOC). Then, when #SOC (the corrected SOC) is lower limit value Sl applied for controlling charging and discharging the battery, the corresponding SOC (actual value) assumes a lower limit value #Sl(T1) applied for controlling charging and discharging the battery, that is higher than lower limit value Sl applied for controlling charging and discharging the battery. In other words, controlling charging and discharging the battery in order to maintain #SOC (a corrected SOC) within a range of lower limit value Sl to upper limit value Sh substantially means controlling charging and discharging the battery in order to maintain SOC (actual value) within a range of lower limit value #Sl(T1) to upper limit value Sh.

Thus the present invention in the second embodiment provides an apparatus controlling charging and discharging a power storage device, that can substantially vary a control range in which to exert control to charge/discharge the power storage device in accordance with estimated battery temperature #Tb to allow secondary battery BAT to have an SOC maintained in a higher range.

With reference to FIG. 12B, if estimated battery temperature #Tb is further lower (#Tb=T2<T1), then CPU 6 selects SOC conversion function F2($x$) for a range of SOC (actual value) smaller than center value Sc applied for controlling charging and discharging the battery, to convert SOC to a value further lower than that provided by SOC conversion function F1($x$).

By SOC conversion function F2($x$), an SOC (actual value) corresponding to #SOC (a corrected SOC) having the same value as lower limit value Sl assumes a lower limit value #Sl(T2) applied for controlling charging and discharging the battery, that is higher than lower limit value #Sl(T1). In other words, a control range in which to exert control to charge/discharge secondary battery BAT can have a lower limit value limited to be higher to ensure that a vehicular system starts.

Thus CPU 6 determines an appropriate SOC conversion function in accordance with estimated battery temperature #Tb obtained and uses the determined SOC conversion function to convert an SOC (actual value) to #SOC (a corrected SOC).

Figure 13:
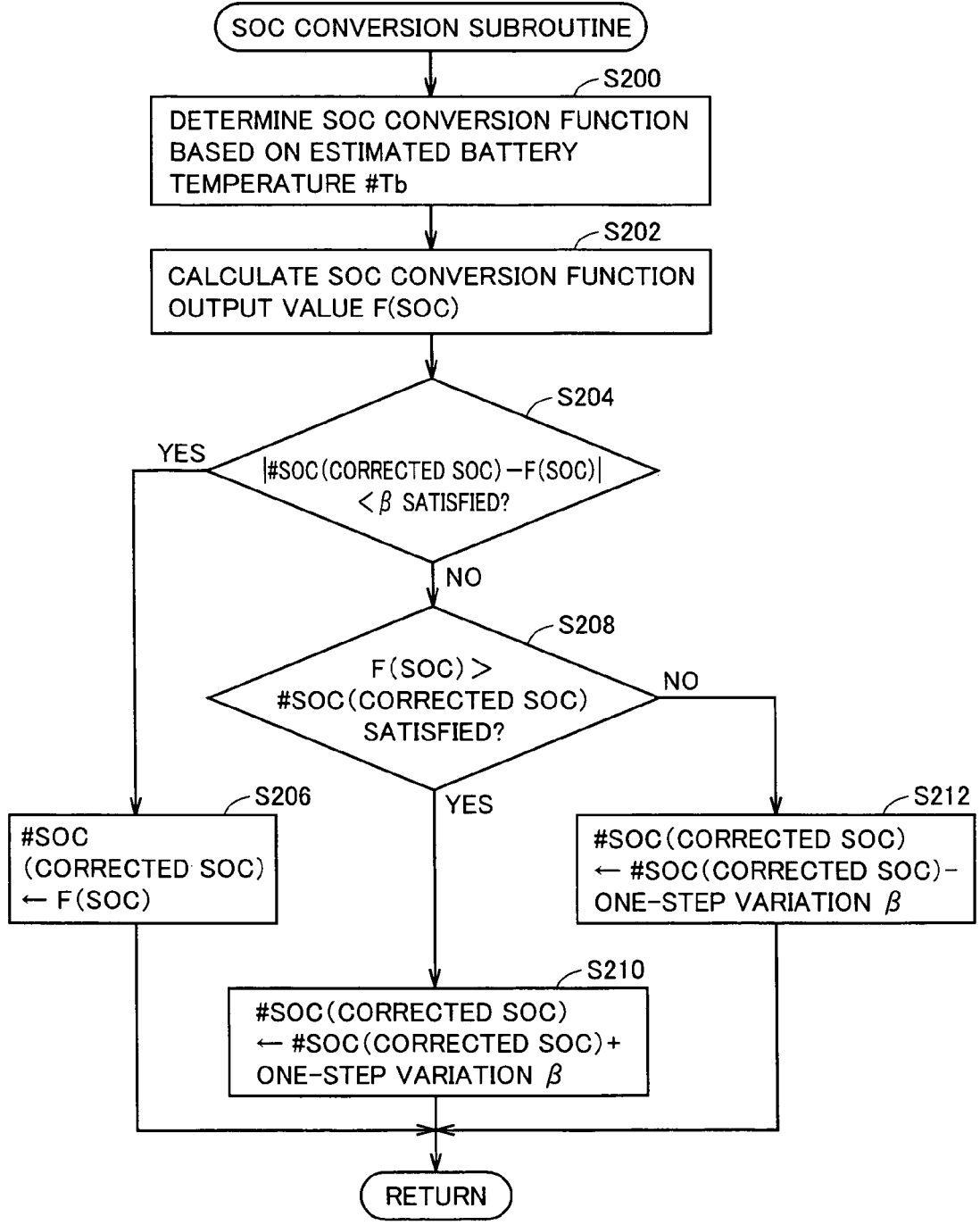
FIG. 13 shows a flow of a process of an SOC conversion subroutine.

Reference will now be made to FIG. 13 to describe a flow of a process of the SOC conversion subroutine.

Initially, CPU 6 determines an SOC conversion function in accordance with estimated battery temperature #Tb obtained (step S200).

Subsequently CPU 6 substitutes the obtained SOC (actual value) in the determined SOC conversion function to calculate an SOC conversion function output value F(SOC) (step S202). Then, CPU 6 determines whether |#SOC (a corrected SOC)-F(SOC)|<β is satisfied (step S204). Herein β represents a one-step variation. More specifically, CPU 6 determines whether a deviation of the current #SOC (the corrected SOC) and SOC conversion function output value F (SOC) is less than one-step variation β to prevent #SOC (the corrected SOC) from instantly, significantly varying.

If |#SOC (the corrected SOC)-F(SOC)|<β is satisfied (YES at step S204), then CPU 6 sets SOC conversion function output value F(SOC) as a new #SOC (a corrected SOC) (step S206), and returns to a previous process.

In contrast, if |#SOC (the corrected SOC)-F(SOC)|<β is not satisfied (NO at step S204), CPU 6 then determines whether F(SOC)>#SOC (the corrected SOC) is satisfied (step S208). More specifically, CPU 6 determines in which direction #SOC (the corrected SOC) should be varied in accordance with which one of the current #SOC (the corrected SOC) and SOC conversion function output value F(SOC) is larger than the other, and CPU 6 varies #SOC (the corrected SOC) by one-step variation β through the following steps:

If F(SOC)>#SOC (the corrected SOC) is satisfied (YES at step S208), CPU 6 sets the current #SOC (the corrected SOC) plus variation β as a new #SOC (a corrected SOC) (step S210), and CPU 6 returns to a previous process.

If F(SOC)>#SOC (the corrected SOC) is not satisfied (NO at step S208), CPU 6 sets the current #SOC (the corrected SOC) minus variation β as a new #SOC (a corrected SOC) (step S212), and CPU 6 returns to a previous process.

Note that while in the above described process flow CPU 6 automatically determines an SOC conversion function based on estimated battery temperature #Tb obtained, an SOC conversion function of a severer direction (i.e., a direction in which estimated battery temperature #Tb is lower) or a less severe direction (i.e., a direction in which estimated battery temperature #Tb is higher) may compulsorily be determined in accordance with the driver's operation.

The remainder is similar to the present invention described above in the first embodiment or its exemplary variations. Accordingly it will not be described repeatedly.

The present invention in the second embodiment provides an effect of the first embodiment and in addition controls charging and discharging a battery on the assumption that SOC has a lower value than an obtained SOC by using an SOC conversion function determined in accordance with estimated battery temperature #Tb. Thus, lower limit value Sl defining a control range in SOC in which to exert control to charge/discharge the battery is not directly varied and can be limited to a substantially higher range. The present invention can be applied without affecting other control and function utilizing lower limit value Sl applied for controlling charging and discharging the battery.

Third Embodiment

The present invention in the first embodiment is described for such a configuration that while a vehicular system is active, estimated battery temperature #Tb is successively obtained and secondary battery BAT is charged/discharged in an amount controlled to have an SOC within a predetermined control range based on estimated battery temperature #Tb. In contrast, the present invention in a third embodiment will be described for a configuration continuing the engine's operation if secondary battery BAT does not have an SOC within a predetermined control range when ignition-off command IGOFF is received.

The present invention in the third embodiment provides an apparatus controlling charging and discharging a power storage device, that is similar to that described in the first embodiment with reference to FIG. 1. Accordingly, it will not be described repeatedly in detail. Note that in the third embodiment CPU 6 implements "means for actuating the engine".

Figure 14:
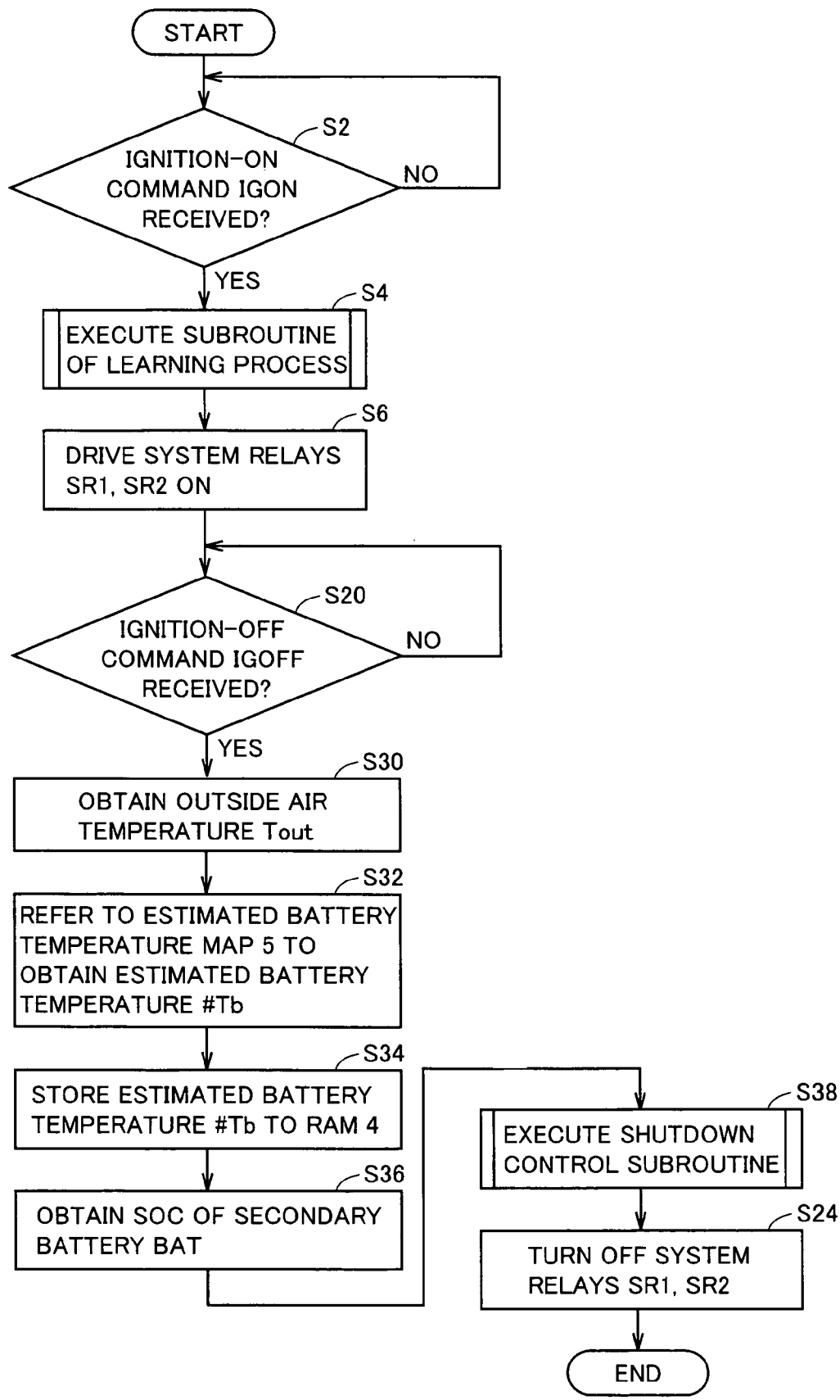
FIG. 14 generally shows a flow of a process performed by an apparatus controlling charging and discharging a power storage device in accordance with a third embodiment of the present invention.

With reference to FIG. 14, the apparatus controlling charging and discharging a power storage device in accordance with the third embodiment provides a process having a flow generally as will be described hereinafter. This flow corresponds to that described in the first embodiment as shown in FIG. 3 minus steps S8-S18 and plus steps S30, S32, S34, S36, S38.

After step S6 is performed, CPU 6 determines whether ignition-off command IGOFF is received (step S20). If not (NO at step S20), CPU 6 waits until ignition-off command IGOFF is received (step S20).

If ignition-off command IGOFF is received (YES at step S20), CPU 6 obtains outside air temperature Tout from outside air temperature measurement unit 18 (step S30), and refers to estimated battery temperature map 5 to obtain estimated battery temperature #Tb corresponding to outside air temperature Tout obtained at step S30 (step S32). Furthermore, CPU 6 stores to RAM 4 the estimated battery temperature #Tb obtained at step S32 (step S34). Furthermore, CPU 6 obtains secondary battery BAT's SOC based on secondary battery BAT's actual voltage Vb, actual current Ib, actual battery temperature Tb and the like (step S36).

Subsequently, CPU 6 performs a shutdown control subroutine (step S38). More specifically, if secondary battery BAT does not have an SOC within a predetermined control range, CPU 6 actuates engine 9 to bring the SOC within the predetermined control range, and once secondary battery BAT has attained an SOC falling within the predetermined control range, CPU 6 shuts down the vehicular system. Once the shutdown control subroutine (step S38) has completed, CPU 6 deactivates system relay commands SRC1, SRC2 to cause system relays SR1, SR2 to transition to be off (step S24), and thus ends the process.

Note that steps S30-S36 in the flow of the process performed by the apparatus controlling charging and discharging a power storage device in accordance with the third embodiment of the present invention are similar to steps S8-S14 in the flow of the process performed by the apparatus controlling charging and discharging a power storage device in accordance with the first embodiment of the present invention shown in FIG. 3.

The remainder of the flow is similar to that of the flow of the process performed by the apparatus controlling charging and discharging a power storage device in accordance with the present invention in the first embodiment as shown in FIG. 3. Accordingly it will not be described repeatedly in detail.

Hereinafter the shutdown control subroutine will be described.

Shutdown Control Subroutine

If a decision is made that when ignition-off command IGOFF is received secondary battery BAT has not been charged to an extent ensuring that the vehicular system can be restarted, CPU 6 actuates engine 9 to cause motor generator 10 to generate electric power to charge secondary battery BAT to the predetermined control range, and then shuts down the vehicular system. Thus controlling charging and discharging secondary battery BAT ensures that the vehicular system is restarted.

Figure 15:
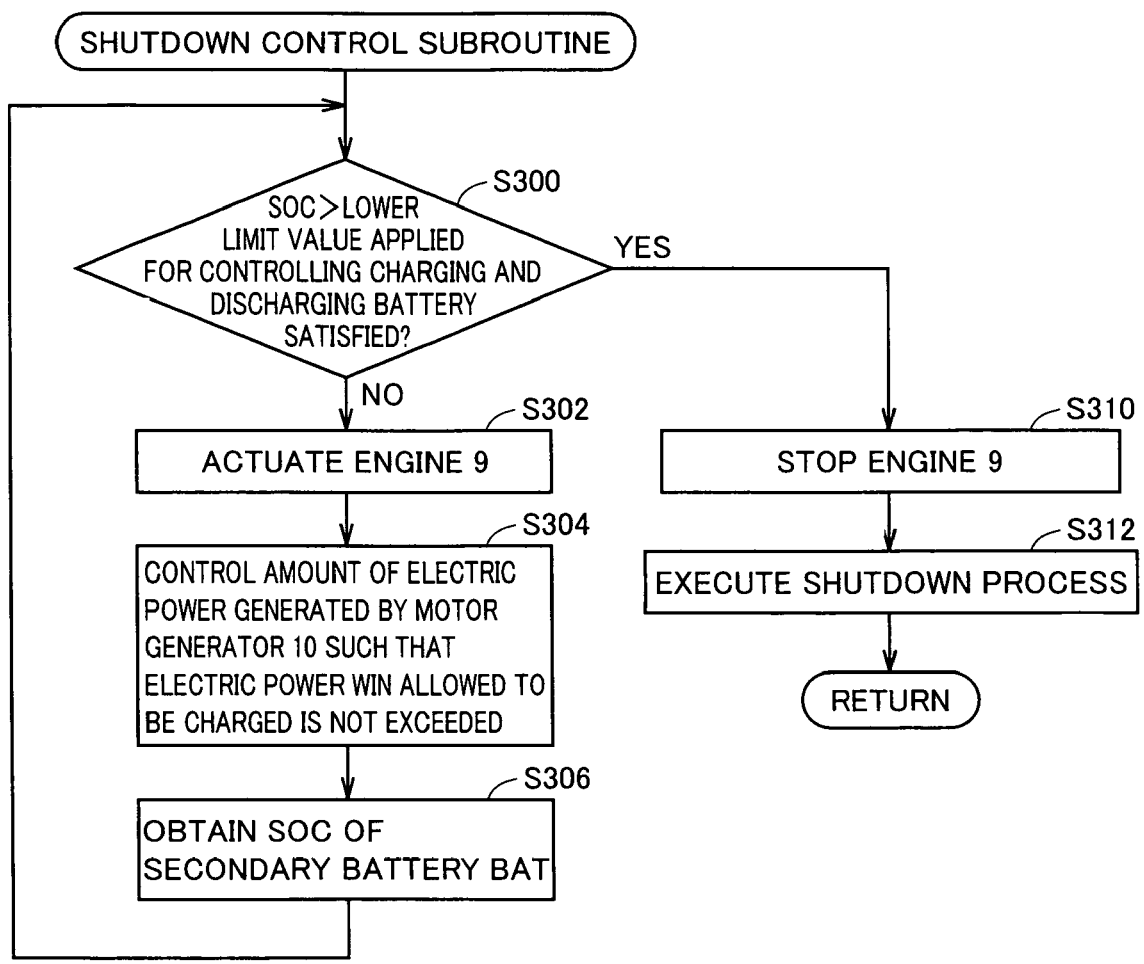
FIG. 15 shows a flow of a process of a shutdown control subroutine.

With reference to FIG. 15, the shutdown control subroutine provides a process having a flow as will be described hereinafter.

Initially, CPU 6 determines whether secondary battery BAT has an SOC (actual value) exceeding a lower limit value applied for controlling charging and discharging the battery (step S300).

If the SOC (actual value) does not exceed the lower limit value applied for controlling charging and discharging the battery (NO at step S300), CPU 6 provides a command to engine ECU 7 to actuate engine 9 (step S302). Note that if engine 9 is inactive when ignition-off command IGOFF is received, CPU 6 starts engine 9, and CPU 6 controls an amount of electric power that motor generator 10 generates, as based on secondary battery BAT's SOC (actual value), such that electric power Win allowed to be charged is not exceeded (step S304).

Subsequently CPU 6 obtains secondary battery BAT's SOC (actual value) (step S306), and CPU 6 again determines whether the SOC (actual value) exceeds the lower limit value applied for controlling charging and discharging the battery (step S300).

In contrast, if the SOC (actual value) exceeds the lower limit value applied for controlling charging and discharging the battery (YES at step S300), then CPU 6 issues a command to engine ECU 7 to stop engine 9 (step S310), and CPU 6 performs a shutdown process for other devices contained in the vehicular system (step S312). Subsequently CPU 6 returns to a previous process.

Thus when ignition-off command IGOFF is received, CPU 6 confirms that secondary battery BAT has been charged to an extent ensuring that a vehicular system can be restarted, and thereafter CPU 6 shuts down the vehicular system.

The remainder is similar to the present invention as described above in the first embodiment or its variations. Accordingly, it will not be described repeatedly in detail.

The present invention in the third embodiment can provide an effect of the first embodiment, and, in addition, starts engine 9 to charge secondary battery BAT if secondary battery BAT does not have an SOC within a control range in which to exert control to charge/discharge secondary battery BAT when ignition-off command IGOFF is received. This ensures that the vehicular system having been shut down restarts, whichever value of SOC secondary battery BAT may have when ignition-off command IGOFF is received.

Fourth Embodiment

The processes involved in the subroutines exemplified in the first to third embodiments of the present invention may all be included in one configuration.

The present invention in a fourth embodiment provides an apparatus controlling charging and discharging a power storage device, that is similar to that is described in accordance with the present invention in the first embodiment shown in FIG. 1. Accordingly, it will not be described repeatedly in detail.

Figure 16:
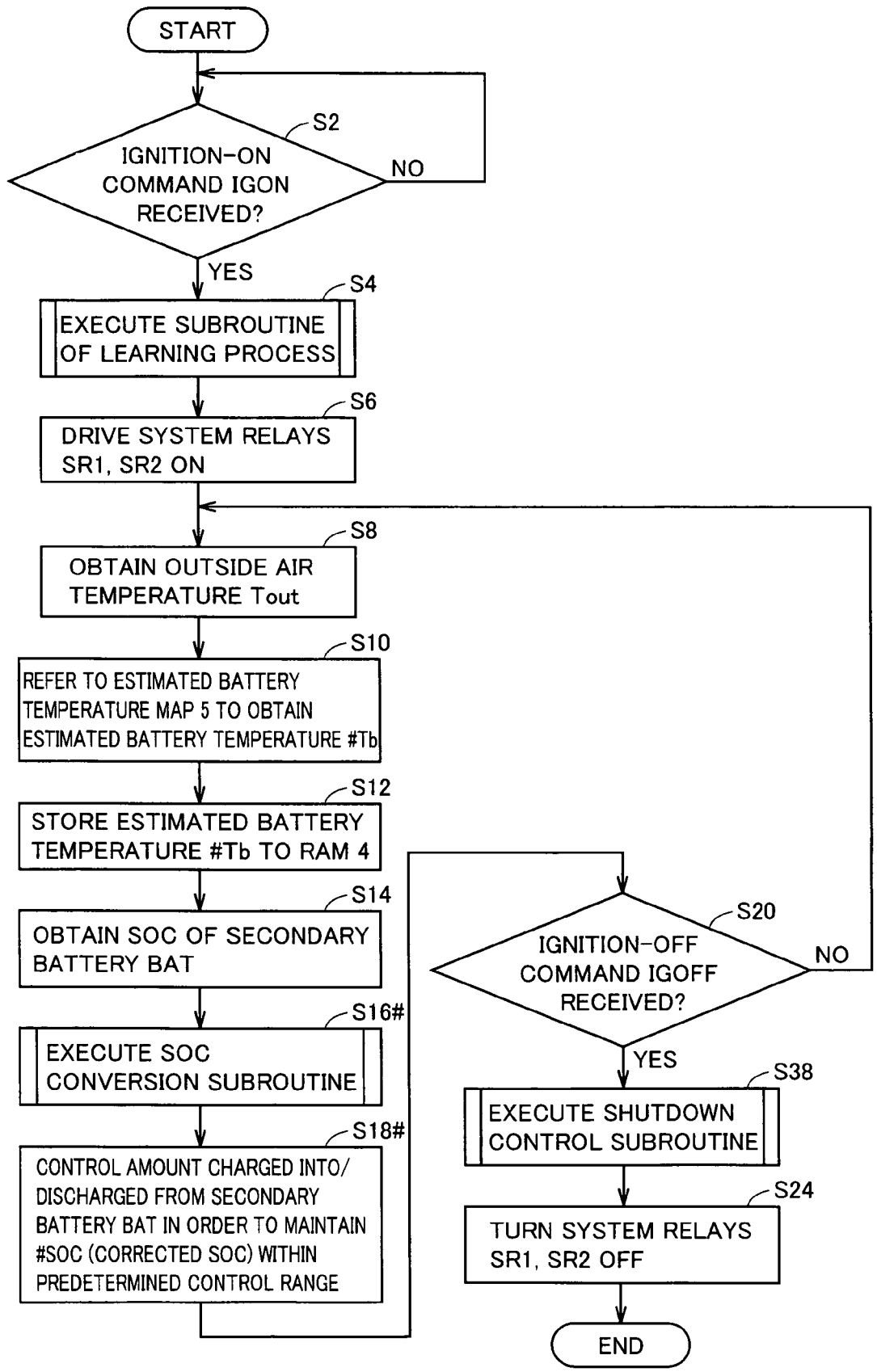
FIG. 16 generally shows a flow of a process performed by an apparatus controlling charging and discharging a power storage device in accordance with a fourth embodiment of the present invention.

With reference to FIG. 16, the apparatus controlling charging and discharging a power storage device in accordance with the fourth embodiment of the present invention performs a process having a flow generally as will be described hereinafter. This flow corresponds to that described in the first embodiment as shown in FIG. 3 having steps S16 and S18 replaced with steps S16# and S18# and also having a step S38 added thereto.

Steps S16# and S18# and the SOC conversion subroutine have specifically been described in the second embodiment of the present invention, as described above. Accordingly, they will not be described repeatedly in detail. Furthermore, step S38 and the control subroutine have specifically been described in the third embodiment of the present invention, as described above. Accordingly, they will not be described repeatedly in detail. Note that the general flow of the process performed by the apparatus controlling charging and discharging a power storage device in accordance with the fourth embodiment of the present invention may have the FIG. 14 steps S30, S32, S34, S36 eliminated therefrom, as preceding steps (steps S8-S14) are similar thereto.

The remainder is similar to the present invention as described above in the first embodiment or its variations. Accordingly, it will not be described repeatedly in detail.

The present invention in the fourth embodiment can provide the effects of the first to third embodiments simultaneously.

Other Embodiment

The present invention in the first to fourth embodiments and the first Embodiment's exemplary variations has been described for a vehicle having mounted therein the present apparatus controlling charging and discharging a power storage device. However, the present invention is also applicable to any apparatuses and systems with a secondary battery that is susceptible to variation in temperature.

Furthermore the present invention in the first to fourth embodiments and the first Embodiment's exemplary variations has been described by way of example for a configuration implementing "means for obtaining estimated battery temperature" by an estimated battery temperature map having a plurality of components of estimated battery temperature #Tb stored therein in association with outside air temperature Tout. However, it may be implemented by a configuration other than that. For example, a function having outside air temperature Tout as a variable may be used to calculate estimated battery temperature #Tb successively. In that case, a constant term defining the function will be updated by learning-control.

The present invention in the first to fourth embodiments has been described for a configuration that applies the present apparatus controlling charging and discharging a power storage device to a secondary battery. It is needless to say, however, that the present invention is applicable not only to the secondary battery but also to a capacitor and other similar power storage device that have a characteristic in temperature reducing electric power that they can supply at low temperatures.

It should be understood that the embodiments disclosed herein are illustrative and non-restrictive in any respect. The scope of the present invention is defined by the terms of the claims, rather than the description above, and is intended to include any modifications within the meaning and scope equivalent to the terms of the claims.

The invention claimed is:

1. An apparatus controlling charging and discharging a rechargeable power storage device mounted in a vehicle, comprising:

means for obtaining outside air temperature representing a temperature outside said vehicle;

means for obtaining estimated power storage temperature based on said outside air temperature obtained by said means for obtaining outside air temperature, said estimated power storage temperature representing an estimated value of a temperature that said power storage device has when an ignition-on command is received to restart a vehicular system, said means for obtaining estimated power storage temperature having said estimated power storage temperature stored therein in association with said outside air temperature;

means for obtaining actual power storage temperature representing an actual value of a temperature of said power storage device; and means for learning, updating a relationship between said outside air temperature and said estimated power storage temperature in said means for obtaining estimated power storage temperature, as based on an error between said estimated power storage temperature previously obtained by said means for obtaining estimated power storage temperature and said actual power storage temperature obtained when said ignition-on command is received.

2. The apparatus controlling charging and discharging a power storage device according to claim 1, wherein said means for learning updates said relationship to associate a value obtained from a function including said estimated power storage temperature and said actual power storage temperature with said outside air temperature used to obtain that estimated power storage temperature.

3. The apparatus controlling charging and discharging a power storage device according to claim 1, further comprising:

means for obtaining SOC of said power storage device; and means for controlling an amount charged into/discharged from said power storage device to maintain said SOC obtained by said means for obtaining SOC within a predetermined control range in accordance with said estimated power storage temperature.

4. The apparatus controlling charging and discharging a power storage device according to claim 3, wherein said means for obtaining estimated power storage temperature successively obtains said estimated power storage temperature while said vehicular system is active.

5. The apparatus controlling charging and discharging a power storage device according to claim 3, wherein said means for controlling an amount charged/discharged further includes means for converting said SOC obtained by said means for obtaining SOC into a corrected SOC in accordance with said estimated power storage temperature for controlling charging and discharging.

6. The apparatus controlling charging and discharging a power storage device according to claim 3, wherein:

said vehicle includes an engine configured to be capable of driving generation means for charging said power storage device; and said engine is configured to be started by electric power discharged from said power storage device.

7. The apparatus controlling charging and discharging a power storage device according to claim 6, wherein said means for controlling an amount charged/discharged includes means for starting said engine to allow said SOC to be within said predetermined control range if said SOC is not within said predetermined control range when said ignition-off command is received.

8. An apparatus controlling charging and discharging a rechargeable power storage device mounted in a vehicle, comprising:

a unit obtaining outside air temperature representing a temperature outside said vehicle;

a unit obtaining actual power storage temperature representing an actual value of a temperature of said power storage device; and a control device including a storage unit, wherein:

said control device obtains estimated power storage temperature based on said outside air temperature obtained by said unit obtaining outside air temperature, said estimated power storage temperature representing an estimated value of a temperature that said power storage device has when an ignition-on command is received to restart a vehicular system;

said storage unit has said estimated power storage temperature stored therein in association with said outside air temperature; and said control device updates a relationship between said outside air temperature and said estimated power storage temperature stored in said storage unit, as based on an error between said estimated power storage temperature previously obtained and said actual power storage temperature obtained when said ignition-on command is received.

9. A method for controlling charging and discharging a rechargeable power storage device mounted in a vehicle, comprising the steps of:

obtaining an outside air temperature representing a temperature outside said vehicle;

referring to a previously stored relationship between estimated power storage temperature and said outside air temperature, as based on said outside air temperature obtained, to obtain estimated power storage temperature representing an estimated value of a temperature that said power storage device has when an ignition-on command is received to restart a vehicular system;

obtaining actual power storage temperature representing an actual value of a temperature of said power storage device; and updating said previously stored relationship between said estimated power storage temperature and said outside air temperature, as based on an error between said estimated power storage temperature previously obtained and said actual power storage temperature obtained when said ignition-on command is received;

at least one of the above steps being performed steps being performed by a processor.

* * * * *